United States Patent [19]

Nunn

[11] 4,079,508

[45] Mar. 21, 1978

[54] MINIATURE ABSOLUTE PRESSURE TRANSDUCER ASSEMBLY AND METHOD

[75] Inventor: Timothy A. Nunn, Stanford, Calif.

[73] Assignee: The Board of Trustees of the Leland Stanford Junior University, Stanford, Calif.

[21] Appl. No.: 686,152

[22] Filed: May 13, 1976

Related U.S. Application Data

[60] Continuation-in-part of Ser. No. 604,493, Aug. 13, 1975, abandoned, which is a division of Ser. No. 449,900, Mar. 11, 1974, Pat. No. 3,918,019.

[51] Int. Cl.$^2$ .............................................. B01J 17/00
[52] U.S. Cl. ........................................ 29/580; 29/588; 29/589; 29/610 SG; 338/2
[58] Field of Search ................ 29/580, 588, 589, 590, 29/610 SG; 338/2, 4

[56] References Cited

U.S. PATENT DOCUMENTS

| | | | |
|---|---|---|---|
| 3,417,361 | 12/1968 | Heller | 338/4 |
| 3,757,414 | 9/1973 | Keller | 29/610 SG |
| 3,800,264 | 3/1974 | Kurtz | 338/2 |
| 3,924,322 | 12/1975 | Kurtz | 29/580 |

Primary Examiner—W. Tupman

[57] ABSTRACT

A transducer assembly for measuring absolute pressure utilizing a glass substrate and a thin silicon diaphragm upon which is diffused a piezoresistive bridge circuit. Bridge circuit components are properly oriented and connected to bonding pads formed on the silicon. The glass substrate has a circular well formed therein having a diameter at least as large as the diameter of the diaphragm. Conducting leads are deposited on the glass substrate in a pattern matching that of the bonding pads on the silicon. The silicon is bonded to the glass substrate with the silicon diaphragm overlying the well in the glass and the bonding pads overlying the conducting leads deposited on the glass. The bond provides a hermetic seal around the well, trapping a predetermined pressure therein which serves as a reference pressure. Ambient pressure variations cause stress variation in the diaphragm, resulting in unbalance of the bridge which can be sensed with associated circuits to give an indication of the ambient pressure.

14 Claims, 15 Drawing Figures

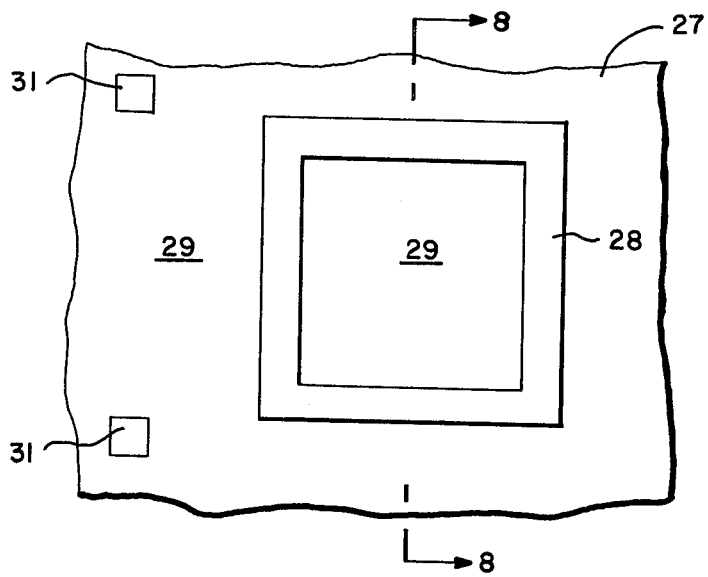
FIG.—7
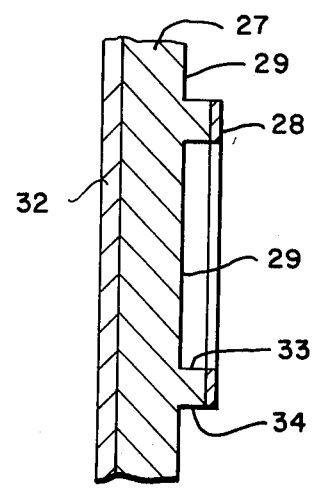
FIG.—8
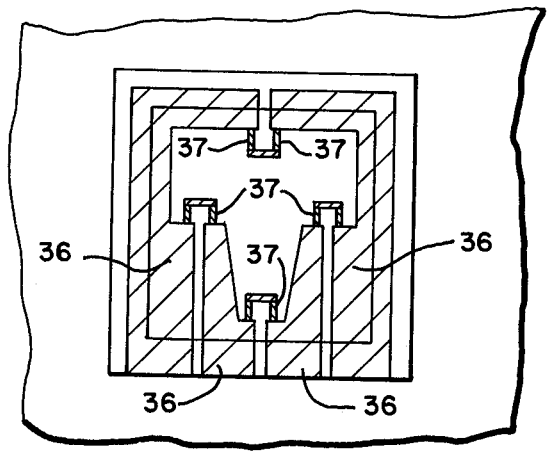
FIG.—9
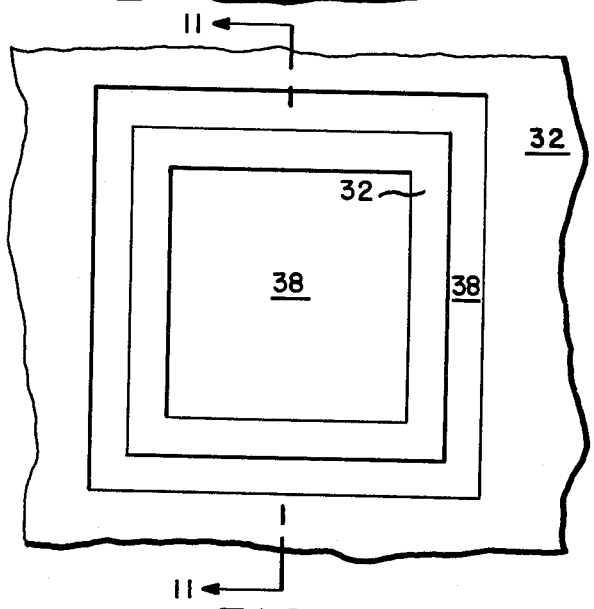
FIG.—10
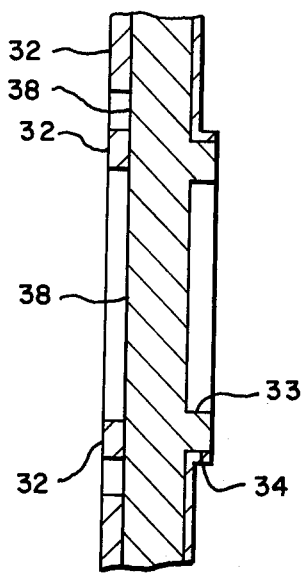
FIG.—11

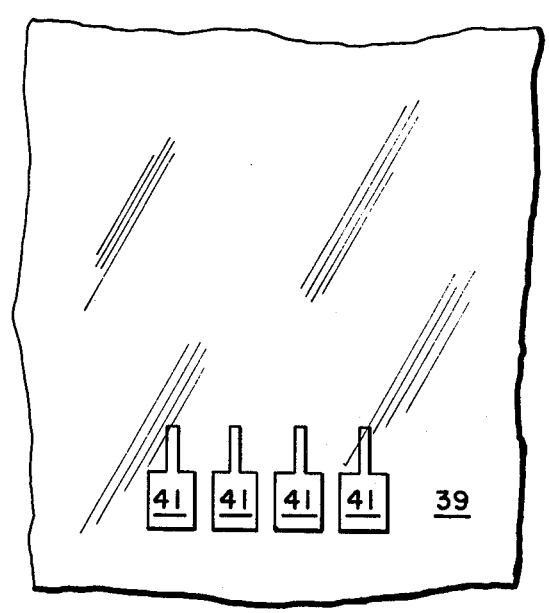
FIG.—12
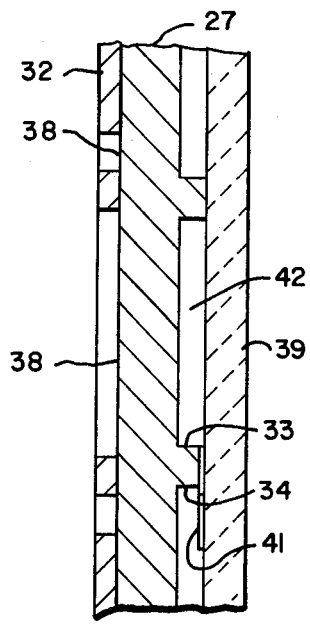
FIG.—13
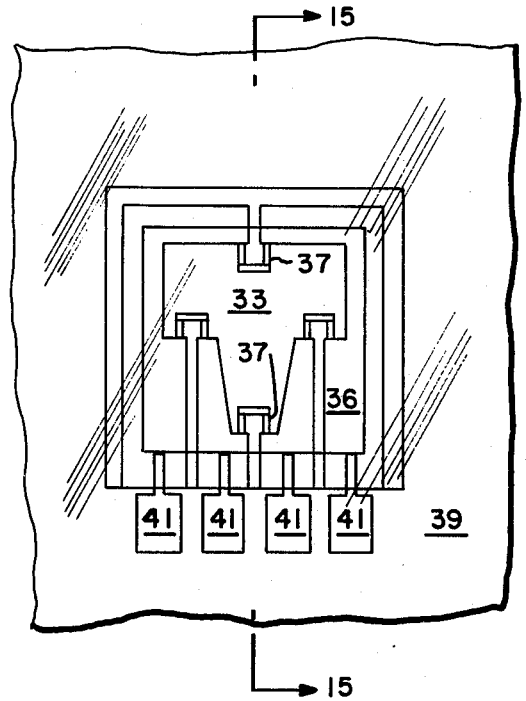
FIG.—14
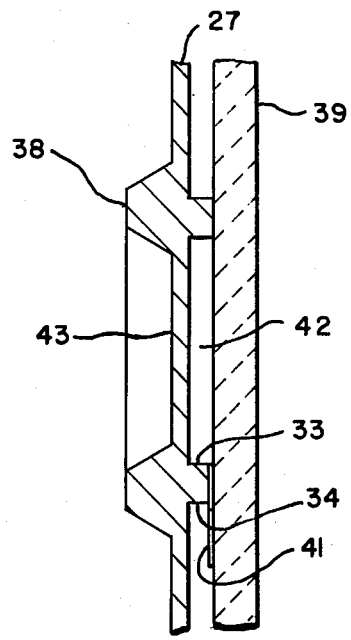
FIG.—15

MINIATURE ABSOLUTE PRESSURE TRANSDUCER ASSEMBLY AND METHOD

CROSS REFERENCE

This application is a continuation-in-part of copending divisional application Ser. No. 604,493, filed Aug. 13, 1975, now abandoned, which was a division of application Ser. No. 449,900, filed Mar. 11, 1974 now issued as U.S. Letters Pat. No. 3,918,019.

BACKGROUND OF THE INVENTION

This invention relates generally to a transducer assembly for measuring absolute pressure and more particularly to a miniature pressure transducer assembly and method using a diaphragm as a stress magnifying device which acts as one wall of a sealed pressure chamber.

Pressure transducers using hermetically sealed bellows or diaphragms are well known as means for indicating ambient pressure when associated with mechanical structure for monitoring diaphragm or bellows motion resulting from ambient pressure change. These transducers are relatively large due to the use of conventional welding processes which place a lower limit on the size of the parts to be welded together. Silicon strain sensitive resistive devices have been individually bonded to members stresses by pressure applied for providing resistance characteristics related to the pressure.

The need to obtain reliable pressure measurements in biological systems has been increasingly felt because of rapid advances in the biomedical field. The cardiovascular system, the cerebro-spinal system, the gastrointestinal system, and the bladder are but a few of the places in the human body where pressure readings are often required. Detailed pressure recordings from the cardiovascular system are the most important, since, in combination with an ECG, they provide accurate diagnosis of the condition of the heart.

At present, the most common techniques for measuring intra-arterial blood pressure utilizes a flexible stainless steel guide wire about 1 mm in diameter which is inserted into the artery. This guide wire is pushed to the location where pressure is to be measured, while its progress is monitored using a fluoroscope. A hollow catheter which envelopes the guide wire is then inserted and pushed to follow the guide wire to the desired location. After next removing the guide wire and filling the catheter with a suitable fluid, the in vivo pressure can be measured by placing a pressure transducer at the end of the liquid-filled catheter, outside the biological system. This method has inherent limitations due to the long path that the pressure wave has to travel to reach the pressure sensor. The recorded pressure wave is a function of the propagation characteristics of the hollow catheter and can depart appreciably from the true in vivo pressure.

Ideally, to avoid this propagation distortion, a pressure sensor could be inserted into the catheter to replace the guide wire; however, due to the scarcity of pressure sensors with an outer diameter equal to or less than that of conventional guide wires, this method is rarely followed.

A need exists for pressure transducers having self-contained reference pressure and very small physical size, which may be obtained through the use of semiconductor materials and integrated circuit processes for providing greater efficiency in the use of available volumes for a pressure transducer.

SUMMARY AND OBJECTS OF THE INVENTION

An absolute pressure transducer has a semiconductor diaphragm which is bonded to an insulator substrate with a chamber formed therebetween. The chamber is hermetically sealed and is formed with the diaphragm serving as one wall of the chamber. A bridge circuit is provided on the diaphragm which is electrically connected to externally accessible conducting leads on the substrate. A predetermined reference pressure is trapped in the chamber during bonding, and the stress, imposed in the diaphragm by ambient pressure as indicated by the state of the bridge balance is indicative of the ambient pressure.

In general, it is an object of the present invention to provide an absolute pressure transducer assembly using assembly structure and methods affording extremely small physical size.

Another object of the present invention is to provide an absolute pressure transducer assembly providing external connections which do not impose physical stress on the pressure sensitive member.

Another object of the present invention is to provide an absolute pressure transducer assembly which may have any desired reference pressure.

Another object of the present invention is to provide an absolute pressure transducer assembly using simple easily controlled steps in the fabrication of the component parts, and in which the number of component parts are maintained at a minimum.

Another object of the present invention is to provide an absolute pressure transducer which is miniaturized using integrated circuit techniques.

Additional objects and features of the invention will appear from the following description in which the preferred embodiment has been set forth in detail in conjunction with the accompnaying drawings.

BRIEF DESCRIPTION OF THE DRAWINGS

FIG. 7 is a plan view of one of the steps in an alternative method for forming the pressure transducer.

FIG. 8 is a sectional view along the line 8—8 of FIG. 7.

FIG. 9 is a plan view of the structure resulting from an additional step in the alternative method of forming the pressure transducer.

FIG. 10 is a plan view of yet another step in the alternative method of forming the pressure transducer.

FIG. 11 is a sectional view along the line 11—11 of FIG. 10.

FIG. 12 is a plan view of structure resulting from another step in the alternative method of forming the pressure transducer.

FIG. 13 is a sectional view showing structure resulting from the alternative method of fabricating the pressure transducer.

FIG. 14 is a plan view of a pressure transducer formed by the alternative method of fabrication.

FIG. 15 is a sectional view along the line 15—15 of FIG. 14.

BRIEF DESCRIPTION OF THE PREFERRED EMBODIMENT

A practical structure for a miniature pressure transducer which could be used for converting blood pressure of a biological system into an electrical signal is obtained by combining a silicon diaphragm, which serves as a stress magnifying device, with diffused piezoresistors for sensing the pressure-induced stresses in the diaphragm. The piezoresistotive effect is observable at low stress levels and is the result of the change in carrier mobility with stress. Combined with the advanced state of silicon processing technology developed for making integrated circuits, this effect makes silicon a desirable material for miniature pressure transducers.

Figure 1:
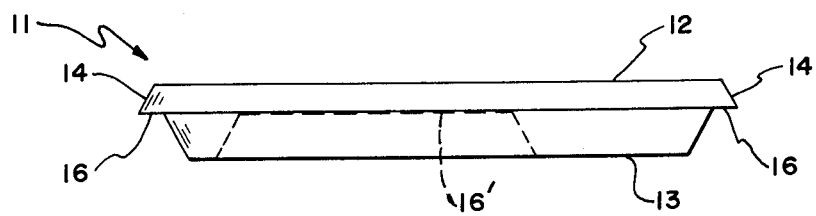
FIG. 1 is a side elevational view of a semiconductor diaphragm assembly having a predetermined diaphragm thickness.
Figure 2:
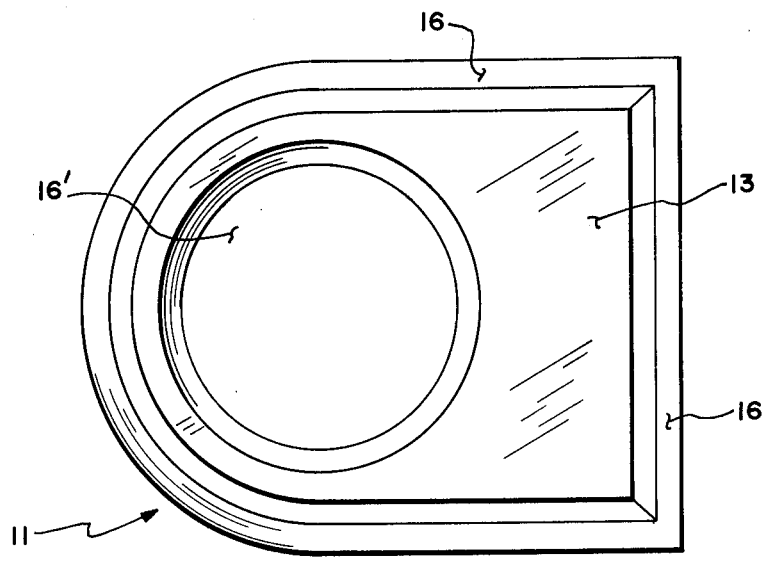
FIG. 2 is a bottom plan view of the semiconductor diaphragm assembly of FIG. 1.
Figure 3:
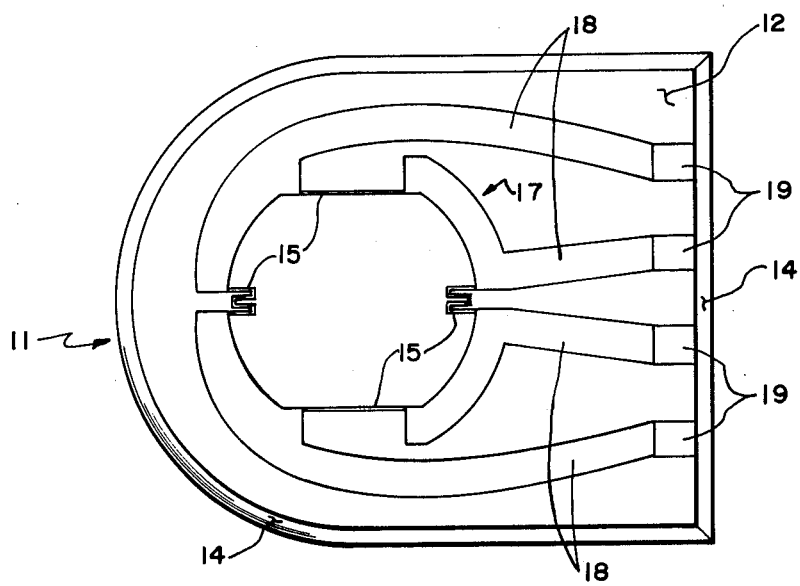
FIG. 3 is a top plan view showing an integrated bridge circuit formed on the semiconductor diaphragm assembly of FIG. 1.

FIG. 1, 2 and 3 show one form of a semiconductor diaphragm fabricated using the method disclosed in U.S. Letters Pat. No. 3,888,708 entitled "Method for Forming Regions of Predetermined Thickness in Silicon". As disclosed therein a silicon integrated circuit pressure transducer or silicon diaphragm assembly 11 is formed by using a silicon wafer having faces 12 and 13 as shown in FIG. 1. Faces 12 and 13 are oriented in the (100) crystallographic plane.

An anisotropic etching technique is used for the formation of the diaphragms. This technique makes possible a novel thickness monitoring scheme which acts also as a chip separation etch. Sensors with diaphragm diameters of 0.5 mm and thicknesses of only 5 μ m, surrounded by a 0.15 mm wide ring of thick silicon, have been batch fabricated using this technique. An intrinsic sensitivity of 14 μvolt per volt supply per mmHg has been achieved.

In the method for forming the silicon diaphragm assembly 11 a slot is formed in an etch resistant layer applied to face 12. The slot has a predetermined width and when the silicon body is exposed to the anisotropic etchant the etch proceeds through the slot in the etch resistant layer until a "V" shaped groove is formed. The sides of the "V" shaped groove correspond to the (111) crystallographic plane. When the "V" groove is completed no (100) crystallographic surface is left exposed to the anisotropic etchant, and the etching effectively stops from the side of the silicon body having face 12. Thus, the slot width determines the final depth of the "V" groove. The slot width is approximately the square root of 2 times the depth of the groove. By appropriately selecting the slot width, the depth of the "V" groove is selected. One side of the "V" groove is seen at 14 in FIG. 1 and the surface 14 corresponds to the (111) crystallographic plane as mentioned above.

Continuing the method disclosed in the referenced application an etch resistant layer is also applied to the face 13 of the silicon diaphragm assembly 11. Portions of the etch resistant layer are removed by any conventional process, such as photolithography, exposing face 13 in areas 16 and 16'. When the silicon body is placed in an anisotropic etchant, etching continues from face 13 toward the bottom of the "V" groove, one side of which is formed by surface 14. A visual indication of the interception of the "V" groove bottom by the etchant proceeding from face 13 is provided when the silicon body separates from the surrounding portions of the silicon wafer following which the etch is quenched. The thickness of the silicon from areas 16 and 16' to face 12 is therefore at the predetermined thickness represented by the height of the "V" groove.

The remaining silicon material below surface 13 which was protected by the etch resistant layer provides a reinforcing area surrounding the area 16' which in this embodiment is circular in shape. The reinforcing area 13 thus provides structural support for circular area 16' and defines the boundaries of circular area 16'. Circular area 16' will hereinafter be referred to as diaphragm 16'.

Diaphragm 16' is an essential part of the pressure transducer. The stress magnification properties of a clamped circular diaphragm are proportional to the square of the ratio of the diaphragm radius to its thickness. Diaphragm thicknesses of about 5μm are required for obtaining reasonable sensitivities with pressure sensors having diaphragm diameters of about 0.5 mm. The supporting rim 13 of thick silicon is then necessary to facilitate the handling and mounting of these structures.

The pressure-induced stresses on diaphragm 16' are sensed by four properly-oriented piezoresistors 15 interconnected to form a bridge circuit 17. Two diametrically opposite resistors 15 in the bridge 17 have the same sign of piezoresistivity, which is opposite to that of the remaining two resistors. After analyzing the stress patterns of the diaphragm and the orientation dependence of the piezoresistivity, the change in bridge unbalance due to an applied pressure can be maximized.

Figure 5:
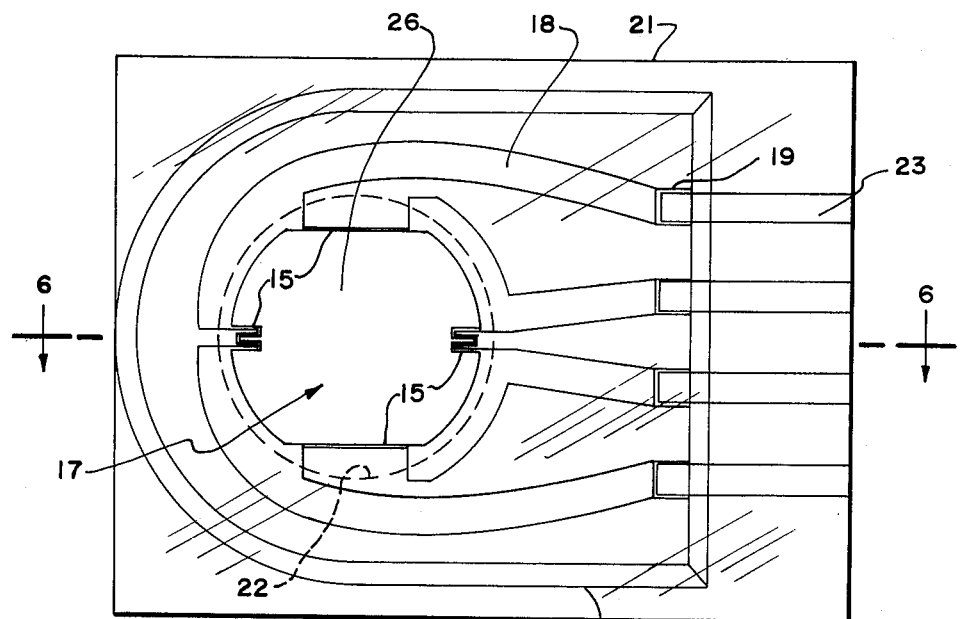
FIG. 5 is an assembly plan view of an absolute pressure transducer assembly

The piezosensistive bridge circuit shown generally at 17 is formed on surface 12 opposite area 16' as seen in FIGS. 3 and 5. The starting material used for the fabrication of the silicon diaphragm assembly 11 is n-type, 50 to 75 μm thick, (100) -oriented silicon wafers. Generally the starting material has one side of the wafer polished and both sides covered with silicon dioxide.

The first processing step involves the stripping of the original oxide of the wafers and regrowing it at a temperature of 1100° C. to a thickness of 7000° A. This oxide is used as a mask for the resistor and substrate contact diffusions and also as a mask during the diaphragm etching step.

To facilitate the photolithography of related patterns on the front and back side of the wafer, alignment marks are photoengraved on both sides of the wafer using a special jig, and succeeding masks are then aligned with respect to these marks. The alignment marks are aligned with flats on the wafer derived by cleaving the wafer along the (110) crystallographic directions.

To make the fabrication as compatible as possible with standard bipolar integrated circuit processing, the p-resistors 15 are diffused according to a standard base diffusion schedule, resulting in a sheet resistivity of close to 100 ohms per square. This schedule yields resistors 15 with a high piezoresistive coefficient and should also make possible the incorporation of on-chip signal processing at a later state in sensor development. Conducting paths 18 (doped P+) are formed using a standard emitter diffusion schedule.

After opening the contact holes and removing the photoresist, chromium is then evaporated over the entire wafer to a thickness of approximately 50A. A layer of gold approximately 1500A thick is then evaporated on top of the chromium layer. Again using photolithography, the gold and chromium layers are selectively etched away leaving the contact or bonding pads 19. The wafers are now ready for the diaphragm etching step previously described.

Figure 4:
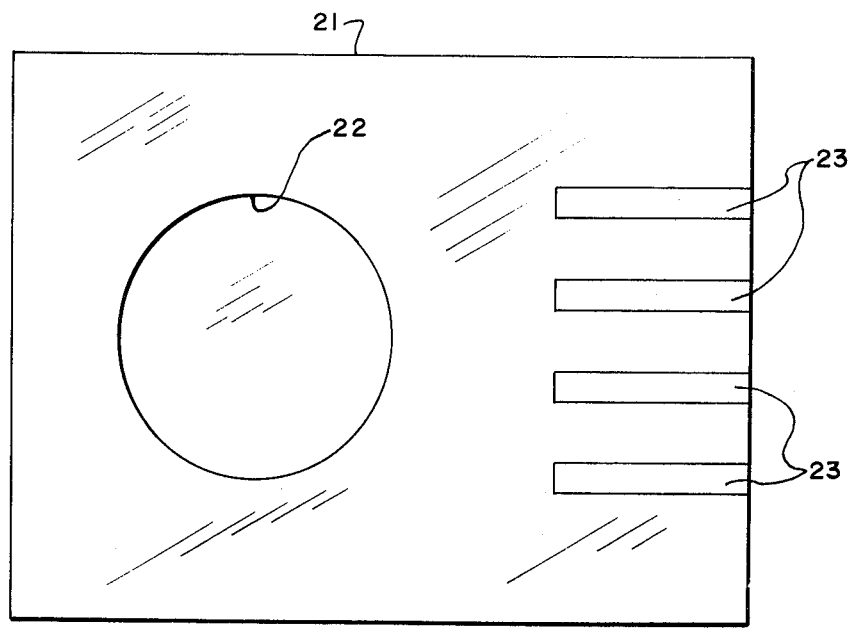
FIG. 4 is a plan view of an insulator substrate.

Referring to FIG. 4 an insulating substrate 21 is shown having formed therein a well 22 with a diameter equal to or larger than the diameter of diaphragm 16'. Also formed on the surface of insulating substrate 21, on the same surface as that in which well 22 is formed, are a plurality of conducting leads 23 having a spacing matching the pattern of the bonding pads 19 on diaphragm assembly 11.

One method of obtaining the finished insulating substrate 21 involves deposit by evaporation of a thin layer of chromium, approximately 50 angstroms, onto a glass substrate 21. A top layer of gold is evaporated directly onto the chromium. A photolithography is then performed for removing a small circle of the chromium gold layer corresponding in size to the diameter of well 22. The exposed glass substrate is then etched to a depth of approximately 100 $\mu$m. A subsequent photolithography removes all of the remaining chromium-gold layer except that providing the conducting leads 23.

Figure 6:
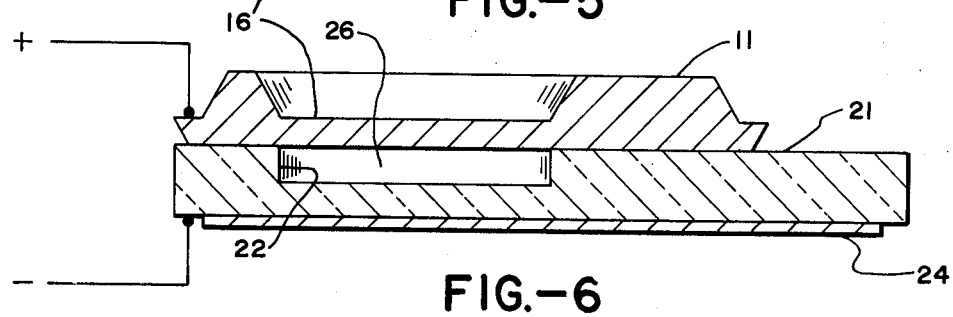
FIG. 6 is a sectional view along the line 6—6 of FIG. 5.

Surface 12 on silicon diaphragm assembly 11 is then placed adjacent to the surface on the insulating substrate 21 upon which the conducting leads 23 are formed. Diaphragm assembly 11 is oriented so that the center of diaphragm 16' overlies the center of well 22, and the bonding pads 19 each overlie a portion of one of the spaced conducting leads 23. FIG. 6 shows the diaphragm assembly 11 and the insulator substrate 21 in position as described above.

The final step is the bonding of the silicon diaphragm assembly 11 containing the integrated circuit to the insulator substrate 21. Diaphragm assembly 11 may be bonded to the insulator substrate 21 using an anodic bonding process. The insulator substrate 21 is a glass material and is referred to as a glass cap in this embodiment. The insulating substrate 21 may be a thin silicon wafer with glass sputtered onto one surface so that the anodic bonding process may be utilized. The bonding process involves placing the surface of glass cap 21, in which well 22 is formed, in intimate layer contact with surface 12 of silicon diaphragm assembly 11 while properly oriented as shown in FIG. 6. The diaphragm assembly 11 and glass cap 21 are heated to about 300° C. by a heater 24. This temperature is well below the softening point of the glass cap 21 and the melting point of the silicon diaphragm assembly 11. The heated glass cap 21 is slightly conductive. An electrical potential of several hundred volts, sufficient to cause a low density current to flow, is applied across the diaphragm assembly 11 and the glass cap 21 with the silicon diaphragm assembly 11 attached to the anode or positive side of the potential source. An anodically grown bond forming a hermetic seal is created between the diaphragm assembly 11 and the glass cap 21. The method of bonding disclosed in U.S. Letters Pat. No. 3,397,278 has been used for obtaining the bond and seal between diaphragm 11 and glass cap 21. The gold pads 19 connected to the integrated circuit 17 are also bonded to the conducting paths 23 on glass cap 21 during the process in the fashion of a thermocompression bond. No external force is exerted on diaphragm 11 and glass 21 to urge them together to effect the bond. The electrical potential provides an attracting force creating high pressure at the surface interface.

A finished assembly is shown in FIG. 5, which is a view looking through the glass insulating substrate 21. A hermetically sealed chamber 26 is formed defined by the silicon diaphragm 16' and the well 22 in substrate 21. Pressure may be adjusted in chamber 26 during the sealing process to provide any desired reference pressure therein. In this fashion a versatile absolute pressure transducer is provided having any desired predetermined pressure reference. External attachment of leads is easily accomplished by connection to the accessible areas of conducting leads 23 on substrate 21. This protects the delicate silicon diaphragm assembly 11 from breakage during external lead attachment.

The method for forming an absolute pressure transducer includes etching a well 22 in a glass substrate 21 and forming conducting leads 23 on the surface containing the well 22. The method also includes forming a thin silicon diaphragm assembly 11 with a piezoresistive bridge circuit 17 formed thereon including conducting paths 18 and bonding pads 19. Diaphragm assembly 11 is placed overlying the well 22 and bonded in place with the bonding pads 19 in electrical contact with conducting paths 23. Hermetic sealing is obtained in the bonding process which may be anodic bonding. Adjusting a desired reference pressure in a hermetically sealed chamber 26 is obtained during the bonding step in the method.

An extremely small absolute pressure transducer assembly is provided which in one embodiment utilized a glass substrate of sufficient thickness to accept a 100$\mu$m deep well, and which had a length of 2mm and a width of 1.5mm. The silicon diaphragm assembly 11 was formed of a silicon chip having a thickness of from 50 to 100$\mu$m and the etching process produced a diaphragm thickness as low as 5$\mu$m.

The piezoresistor-bridge 17 when excited with a voltage provides an unbalance voltage which is a function of applied pressure on the diaphragm 16'. Silicon diaphragm assemblies having a 0.5 mm diaphragm diameter have been made. The diaphragm thickness was 7$\mu$m. A pressure transducer having 0.5mm diaphragm diameter and 7$\mu$m diaphragm thickness has provided pressure sensitivity of 14$\mu$m volts per volt supply per mm Hg. Higher sensitivities are gained with either thinner diaphragms or larger diameter diaphragms.

An alternative method for forming the pressure transducer disclosed herein will be described referring to FIGS. 7 through 15. In this method, a chamber is formed between a semiconductor chip and an insulator substrate by forming a well in the semiconductor chip. FIG. 7 shows a semiconductor chip 27 which has been masked and thereafter an etch resistant layer 28 formed on the front side thereof. In the instance where the semiconductor chip is silicon, the etch resistant layer 28 may be silicon oxide. Areas 29 are therefore left unprotected on the front side of semiconductor chip 27. Alignment marks such as at 31 are provided by any convenient means. Alignment marks 31 in this instance are provided for registration between the front and back sides of semiconductor chip 27 by a masking step followed by an etching step providing apertures 31 through the semiconductor chip 27.

FIG. 8 shows the results obtained by immersing semiconductor chip 27 in an etching solution with the silicon oxide etch resistant areas 28 inhibiting the etch and the unprotected areas 29 being eroded by the etchant. An etch resistant area 32 is shown on the backside of semiconductor chip 27 which inhibits any etching from the backside of semiconductor chip 27 at this phase of the fabrication. Thus, a well 33 is shown formed in the frontside of semiconductor chip 27 having a raised portion or wall 34 at the edge thereof. A thin diaphragm is formed in subsequent process steps within the boundaries of rim 34. Well 33 is typically 10μm deep.

Referring now to FIG. 9, conducting paths 36 are formed in well 33 and extending over the edge of wall 34 therearound for providing access to a stress sensitive circuit formed on the bottom of well 33. One means for forming conducting paths 36 is by $p+$ diffusion which yields a low resistivity. A number of resistive elements 37 are also formed on the bottom of well 33 which may be obtained by using a standard base diffusion yielding p-type resistors having a surface resistivity of 100 ohms per square. Resistors 37 are interconnected with conducting paths 36 to form a stress sensitive circuit on the bottom of well 33. It should be noted that resistors 37 must be precisely located on the bottom of well 33 so as to be near the edges of the thin diaphragm, which will be formed in subsequent process steps, if maximum pressure sensitivity is desired.

Turning now to FIG. 10 a view of the backside of semiconductor chip 27 is shown wherein portions of backside silicon oxide layer 32 have been removed, leaving exposed portions 38 thereon. Silicon oxide layer 28 has, subsequent to the etching of well 33, been reformed to cover the entire front side of semiconductor chip 27, except that portion overlying wall 34 and well 33 as may be seen in FIG. 11.

FIG. 12 shows an insulating substrate 39, such as glass, upon which a metal layer has been deposited, followed by a photolithography step for protecting the metal layer where bonding pads are desired. A 0.5μm layer of aluminum will suffice whereupon the excess aluminum is etched away leaving an array of conducting paths 41 on the insulating substrate having a pattern for registration with the array of conducting paths 36 where they extend over the edges of wall 34 around well 33. Conducting paths 41 have a wide end as seen in FIG. 12, which is externally accessible. FIG. 13 shows insulating substrate 39 overlying well 33 with conducting paths 41 in contact with the conducting paths 36 extending over the edge of well 33. In this fashion, external access to the stress sensitive circuit including resistors 37 and conducting paths 36 in well 33 is provided. A bond is formed between insulating substrate 39 and semiconductor chip 27 while the conducting paths 36 and 41 have portions in registration. The bond may be formed in the same manner as the bond is formed in the description of the embodiments of FIGS. 5 and 6 above. Consequently, a hermetically sealed chamber 42 is formed between insulating substrate 39 in the bottom of well 33, while simultaneously bonding conducting paths 41 and 36. The stress sensitive circuit formed by conducting paths 36 and resistors 37 is thereby inside hermetically sealed chamber 42. A top view of the assembly of FIG. 13 looking through the insulating substrate 39 is shown in FIG. 14, wherein conducting paths 36 and 41 are in registration portions thereof for affording external access to the stress sensitive circuit including resistors 37. An etch is applied to the backside of semiconductor chip 27 which is timed to remove a predetermined amount of the semiconductor materials from the backside of chip 27 in the areas 38. A quench follows after a predetermined time in the etch solution, whereby a thin section 43 remains between the backside of chip 27 in the bottom of well 33. This thin section 43 forms a diaphragm which is subject to stress due to differential pressure between chamber 42 and the external environment. The stress effects the electrical characteristics of the bridge circuit formed by resistors 37 which is detected through conducting paths 41, thereby providing an indication of pressure across the thin section or diaphragm 43. It should be noted that resistors 37 must be displaced from the edges of the bottom of well 33 due to inability to mask with fine definition on the edge. The backside surface of diaphragm 43 has a smaller lateral dimension as shown in FIG. 15 due to the positioning of the backside masking. Thus, the resistors 37 are positioned closer to the edge of diaphragm 43 to obtain the aforementioned maximum sensitivity. It should also be noted that both well 33 etched from the front side of semiconductor chip 27 and the etching from the backside of chip 27 to obtain the final predetermined thickness in diaphragm 43 is a timed process followed by a quench to halt the etching process immediately after a predetermined period of time. A typical etch rate for silicon using potassium hydroxide/water solution for an etch, is 3μm per minute. Using the etch time method, diaphragms may be obtained to within $+-1\mu m$ of the desired diaphragm thickness.

Leads are thereafter attached to the conducting paths 41 using forty gauge multistrand copper conductor bonded to pads 41 by means of a conductive silver epoxy. Strain relief is afforded the connecting points at conducting paths 41 by covering the connections with nonconductive epoxy.

The pressure transducer described in Fiugre 7 through 15 is connected in the illustrated example to form a Wheatstone bridge as the stress sensitive circuit. When pressure is applied external to chamber 42, the diaphragm deflects, causing the resistors 37 to change in value. The change in resistance is linear with pressure, thereby causing the output voltage from the bridge to change linearly with the pressure. The four resistors 37 are oriented on the diaphragm such that two opposing resistors increase in value with the pressure while the other two opposing resistors decrease an equal amount. Thus, the driving point impedance does not change with the pressure. However, the p-type resistors have a positive temperature coefficient of resistance, causing the driving point impedance to increase with temperature. This change in impedance can be used to measure temperature simultaneously with pressure and/or to provide a temperature sensitive signal to compensate the pressure output, thereby making the output insensitive to temperature changes.

The high sensitivity realized permits pressure variations as small as 0.1 mmHg to be resolved with diaphragms which are 0.5 mm on a side and 10μm thick. Even with these thin diaphragms, the pressure sensitives of all sensors realized from a processing run are usually within 15 percent of the average value, with the variations attributed to small differences in diaphragm thickness from sensor to sensor. No changes in sensitivity due to repeated diaphragm flexing have been observed.

From the pressure sensitivity and the known values of diaphragm diameter and thickness, the piezoresistive coefficient of the diffused p-type resistors for known value of sheet resistivity may be calculated. Substituting the known values into the following equation:

$$\frac{V_{Out}}{V_{supply}} = \frac{1}{2}\left[\left(\frac{\Delta R}{R}\right)_r - \left(\frac{\Delta R}{R}\right)_t\right]$$

and equating it with the measured sensitivities, we find the value of $\pi_{44} = 75 \times 10^{-12}\,cm^2 dyne^{-1}$. This value of $\pi_{44}$ is in agreement with the published value for the resistivity used.

The frequency response of these transducers is more than adequate for biomedical applications. Although detailed frequency measurements have not been made above 10 kHz, the first calculated diaphragm resonance is at about 60 kHz for the 1.2mm diaphragm and is considerably higher for the smaller sensor.

These sensors, after being mounted on the tip of a smaller catheter, may be inserted into the biological system through the inner bore of a larger cathether which was formerly occupied by a guide wire. The sensor disclosed herein, having its own contained reference pressure cavity, does not require a clear passage to ambient pressure to make it vivo measurements.

What is claimed is:

1. The method of forming an absolute pressure transducer comprising the steps of etching a well in an insulating substrate, forming conducting leads in a predetermined pattern on the insulating substrate, fabricating a thin semiconductor diaphragm, forming a stress sensitive circuit on the diaphragm, orienting the diaphragm overlying the well with the stress sensitive circuit in electrical contact with the conducting leads and bonding the contacting portions of the circuit and the leads together, while simultaneously bonding the semiconductor and insulating substrate together to form a hermetically sealed chamber defined by the diaphragm and the well, with the stress sensitive circuit being positioned within the chamber, whereby ambient pressure imposes stress in the diaphragm and the stress sensitive circuit characteristics are indicative of pressure.

2. The method of forming an absolute pressure transducer as in claim 1 wherein said step of bonding comprises the steps of heating the semiconductor and the substrate, applying a positive voltage of several hundred volts or more to the semiconductor, grounding the insulating substrate, and maintaining the heat and the voltage for a predetermined period of time.

3. The method of forming an absolute pressure transducer as in claim 2 together with the step of evaporating a conductive metal material on the diaphragm forming a pattern of bonding pads matching the predetermined pattern on the insulating substrate and in electrical contact with the stress sensitive circuit, and wherein the step of forming conductive leads comprises evaporating a conductive metal material on the diaphragm, so that the bonding pads and conductive leads are bonded in the fashion achieved by thermocompression bonding.

4. The method of forming an absolute pressure transducer as in claim 1 together with the step of adjusting the pressure in the well whereby any desired reference pressure value may be obtained.

5. The method of forming an absolute pressure transducer as in claim 1 wherein the step of forming a stress sensitive circuit comprises the step of diffusing a predetermined array of separate piezoresistive elements into the semiconductor, and connecting the piezoresistive elements in the form of a resistive bridge.

6. A method of fabricating a pressure transducer utilizing a semiconductor chip, comprising the steps of forming an alignment reference on the semiconductor chip for indicating relative location of surface areas on the front and back sides thereof, etching a well in the front side, forming an array of conducting paths in the well extending over the edge of the well, diffusing a resistor array in the well interconnecting with the conducting paths, bonding a fluid impervious insulating layer over the well, thereby forming a hermetically sealed chamber therebetween, etching the back side through a surface area thereon in registration with the well wherein the registration is obtained through use of the alignment reference, said last named etching being continued until a predetermined thickness of the semiconductor chip remains between the bottom of the well and the etched back side, and coupling conductive leads to the conducting paths where they extend over the edges of the well, thereby obtaining external access for detection of change in the value of resistors in the resistor array as stress is induced in the predetermined thickness by differential pressure change thereacross.

7. A method as in claim 6 wherein the step of coupling conducting leads includes the step of forming an array of conducting paths on the fluid impervious insulating layer for registration with the array of conducting paths extending over the edges of the well.

8. A method of forming a pressure transducer from a semiconductor chip having a self contained reference pressure comprising the steps of forming a registration reference for front and back sides of the semiconductor chip, masking the front side to leave exposed a well area thereon, etching a well through the well area, timing the etch through the well area, quenching the etch through the well area after a predetermined time to obtain a predetermined well depth, forming an array of conductor paths in the well extending over the edges thereof, diffusing an array of resistors in the well interconnecting with the conductor paths, forming an externally accessible array of conductor paths on an insulator substrate for registration with the array of conductor paths extending over the edges of the well, bonding the insulator substrate over the well with the conducting paths in registration thereby forming a chamber containing the reference pressure, masking the back side to leave exposed a diaphragm area thereon, etching through the diaphragm area, timing the etch through the diaphragm area, quenching the etch through the diaphragm area after a predetermined time to obtain a semiconductor diaphragm having a predetermined thickness between the well and the etched back side, whereby connection to the externally accessible array of conductor paths monitors change of resistor values resulting from stress in the diaphragm induced by change in external pressure relative to the reference pressure which is indicative of external pressure.

9. A method of fabricating a pressure transducer using a semiconductor chip, comprising the steps of forming externally accessible conducting paths on an insulating substrate, fabricating a thin semiconductor diaphragm on the chip, etching a chamber defined between the diaphragm and the insulating substrate, forming a stress sensitive circuit on the diaphragm having circuit access conducting paths extending beyond the diaphragm boundaries in a pattern for registration with portions of the externally accessible conducting paths, and bonding the insulating substrate to the semiconductor chip to hermetically seal the chamber therebetween while simultaneously bonding together the registered portions of the conducting paths thereon with the stress sensitive circuit being position within the chamber, whereby ambient pressure imposes stress in the diaphragm and the stress sensitive circuit characteristics are indicative of pressure.

10. A method as in claim 9 wherein the step of etching a chamber comprises the step of etching a well in the insulating substrate.

11. A method as in claim 9 wherein the step of etching a chamber comprises the step of etching a well in the semiconductor chip.

12. A method as in claim 9 wherein the step of bonding comprises the steps of heating the semiconductor and the substrate, applying a positive voltage of several hundred volts or more to the semiconductor, grounding the insulating substrate, and maintaining the heat and the voltage for a predetermined period of time.

13. The method of forming an absolute pressure transducer as in claim 9 together with the step of adjusting the pressure in the well whereby any desired reference pressure value may be obtained.

14. The method of forming an absolute pressure transducer as in claim 9 wherein the step of forming a stress sensitive circuit comprises the step of diffusing a predetermined array of separate piezoresistive elements into the semiconductor, and connecting the piezoresistive elements in the form of a resistive bridge.

* * * * *